United States Patent [19]
Basnett

[11] Patent Number: 6,155,385
[45] Date of Patent: Dec. 5, 2000

[54] VEHICLE BRAKE SYSTEMS

[75] Inventor: Michael Neil Basnett, Powys, United Kingdom

[73] Assignee: Rover Group Limited, Warwick, United Kingdom

[21] Appl. No.: 09/160,008

[22] Filed: Sep. 24, 1998

[30] Foreign Application Priority Data

Oct. 15, 1997 [GB] United Kingdom .................... 9721723

[51] Int. Cl.⁷ ..................................................... F16D 55/08
[52] U.S. Cl. ................. 188/72.7; 188/196 V; 188/79.62; 74/512
[58] Field of Search .................................. 60/594; 74/512, 74/514; 188/79.31, 79.53, 79.56, 79.62, DIG. 1, 72.7, 196 V, 72.9

[56] References Cited

U.S. PATENT DOCUMENTS

| | | |
|---|---|---|
| 3,470,974 | 10/1969 | Pefine . |
| 3,739,579 | 6/1973 | Lutz .......................................... 74/512 |
| 3,891,071 | 6/1975 | Tuzson . |
| 4,019,612 | 4/1977 | Mathews . |
| 4,146,108 | 3/1979 | Sato ......................................... 188/163 |
| 4,950,028 | 8/1990 | Harrison ................................ 303/116.1 |

FOREIGN PATENT DOCUMENTS

| | | |
|---|---|---|
| 24 15 683 | 10/1974 | Germany . |
| 34 26 964 | 1/1986 | Germany . |
| 43 38 068 | 3/1995 | Germany . |
| 44 38 966 | 12/1995 | Germany . |
| 385410 | 12/1932 | United Kingdom . |
| 2049850 | 12/1980 | United Kingdom . |
| 2074679 | 11/1981 | United Kingdom . |
| 2077375 | 12/1981 | United Kingdom . |
| 97/12794 | 4/1997 | WIPO . |

*Primary Examiner*—Christopher P. Schwartz
*Assistant Examiner*—Robert A. Siconolfi
*Attorney, Agent, or Firm*—Davis And Bujold

[57] ABSTRACT

In a vehicle brake system a wedge is provided between the brake pedal and the pushrod which operates the master cylinder. Movement of the wedge is controlled by a control unit by means of a solenoid, when the control unit anticipates that the brakes may be operated by the driver, for example because the accelerator pedal has been released, the wedge is driven between the brake pedal and pushrod to move the brake pads into a pre-activated position in which they are just in contact with the brake pads. This reduces the pedal travel required to operate the brakes.

26 Claims, 2 Drawing Sheets

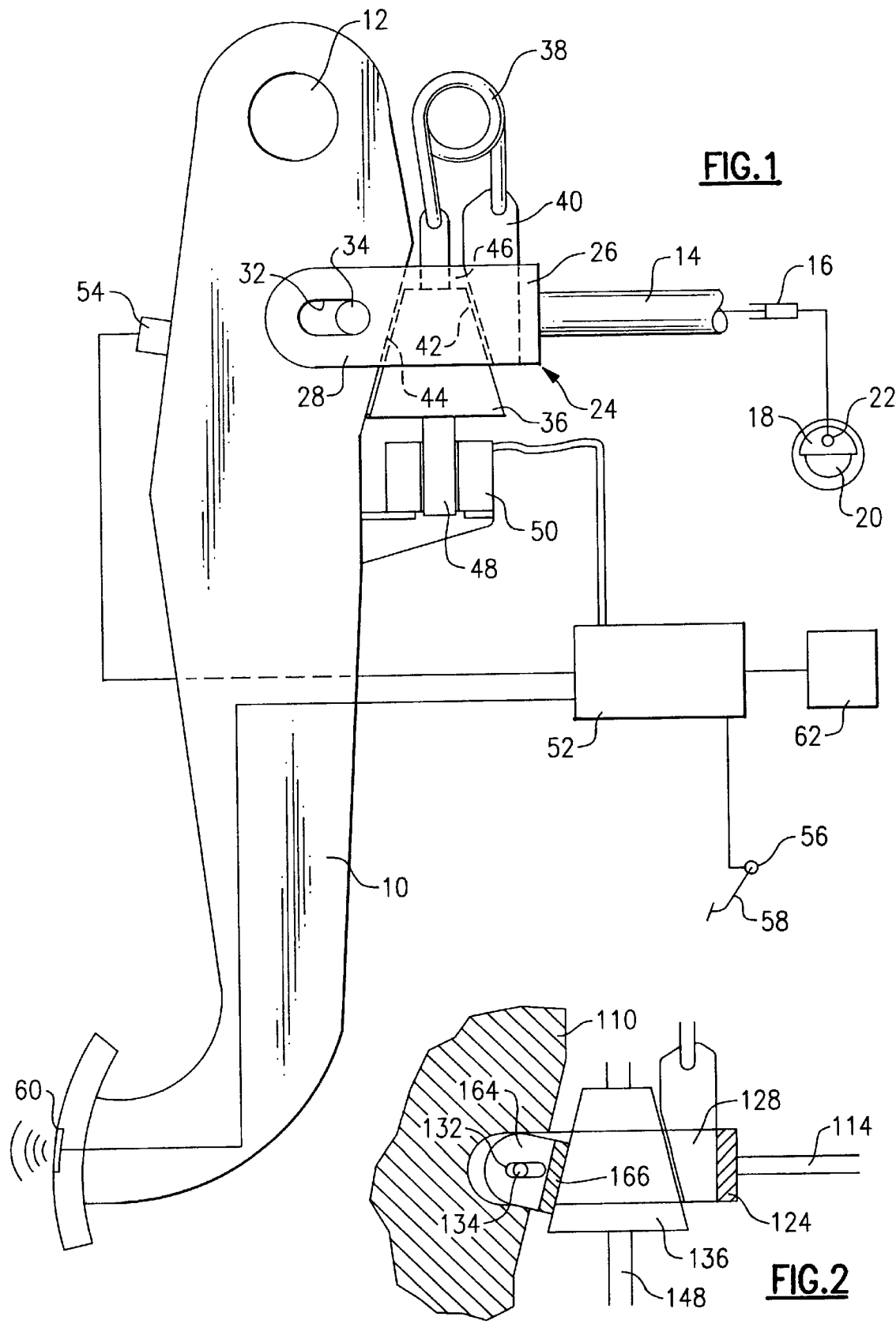

VEHICLE BRAKE SYSTEMS

FIELD OF THE INVENTION

The present invention relates to brake systems for vehicles, and in particular to the problem of reducing brake pedal travel.

BACKGROUND OF THE INVENTION

As crash safety becomes increasingly important in vehicles there is an increasing desire to eliminate, or at least reduce the size of, brake servos. However this creates a problem because higher lever ratios are then required in the brake pedal, which result in increased brake pedal travel and a reduced ability to take up slack in the brake actuation system. This leads to poor feel, and difficulty meeting legislative requirements for circuit failure. It also increases the risk of accidental acceleration where the driver presses the brake pedal but, because his foot is not properly place on the pedal, also catches the accelerator pedal. If there is a lot of free travel in the brake pedal, the two pedals can be depressed quite a long way without much resistance, increasing the speed of the vehicle considerably when the driver intends to apply the brakes.

It is known, for example from U.S. Pat. No. 3,726,369 to provide a brake control system in which sudden release of the accelerator triggers a brief period of braking produced by a solenoid actuator in anticipation of driver braking.

It is also known from GB 2 250 070 to provide a vehicle braking system in which, when driver braking is anticipated, for example due to release of the accelerator pedal, a low pressure is applied to the hydraulic braking circuit for a period of a few hundred milliseconds which is sufficient to take the slack out of the system, but not sufficient to apply the brakes.

SUMMARY OF THE INVENTION

Accordingly the present invention provides a vehicle brake system comprising a rotatable member arranged to rotate with a wheel of the vehicle, a braking member movable into engagement with the rotatable member to provide braking, a driver input member arranged to be operated by a driver of the vehicle to control movement of the braking member, and actuation means arranged to anticipate operation of the brakes by the driver and, when operation of the brakes is anticipated, to move the braking member into contact with the rotatable member and then to return it to a partially released position.

The rotatable member may be a brake disk or a brake drum.

Preferably the system further comprises force transmitting means arranged to transmit force from the driver input member to the braking member to provide normal braking, and the force transmitting means includes two parts which are arranged to be urged together when force is applied to the driver input member, and the actuating means is arranged to drive said parts apart to urge the braking member towards the wheel mounted member.

Preferably the driving apart of said parts also urges the driver input member towards the driver, in a direction which would normally release the brakes. The advantage of this arrangement is that, in the event of a frontal impact, the free play in the input member, generally a brake pedal, is reduced, and its ability to support the part of the driver actuating it, generally his leg, is increased over the first part of its travel. This is beneficial because it has been found that controlled support of the driver's leg on frontal impact can reduce injury to the lower leg.

Indeed the present invention further provides a vehicle brake actuation system comprising a hydraulic brake actuation circuit including a master cylinder, driver input means arranged to be operated by a driver of the vehicle to operate the master cylinder, and actuation means arranged to anticipate operation of the brakes by the driver and, when operation of the brakes is anticipated, to move two parts of the driver input means relative to each other to take up slack in the actuation system.

For example the actuation means may include a wedge arranged to be driven between said parts to move the braking member towards the rotatable member. Alternatively it may comprise a cam which can be rotated to produce the same effect, or indeed any other suitable mechanical mechanism. One of said parts preferably comprises part of a brake pedal and the other of said parts preferably comprises a pushrod.

The actuation means may be driven by a simple solenoid, or alternatively by a stepper motor, a linear motor, or a vacuum or pneumatic device.

Preferably the actuation means includes sensing means for sensing an action by the driver and control means arranged to anticipate operation of the brakes by the sensing of said action.

Preferably the control means is arranged to determine on the basis of said signals when such operation is no longer anticipated, and respond by releasing the partial actuation means. This enables the brakes to remain in the partially actuated condition for as long as conditions prevail in which the driver might use the brakes.

The present invention further provides a brake system comprising driver input means to allow actuation of the brakes by a driver, partial actuation means operable to partially actuate the brake system, sensing means, and control means arranged to anticipate, on the basis of signals from the sensing means, operation of the driver input means and, when such operation is anticipated, to operate the partial actuation means to effect partial actuation of the system thereby to take up slack in the system, and to determine on the basis of said signals when such operation is no longer anticipated, and respond by releasing the partial actuation means.

Preferably the sensing means comprises proximity sensing means arranged to sense the proximity of a part of a driver to the driver input member.

The sensing means is preferably arranged to sense release of an accelerator of the vehicle.

The control means is preferably arranged to monitor the operation of a power train of the vehicle and is arranged to anticipate operation of the brake from the operation of the power train, for example when it senses that the power train is in overrun applying a braking force to the vehicle.

Preferred embodiments of the present invention will now be described by way of example only with reference to the accompanying drawings.

BRIEF DESCRIPTION OF THE DRAWINGS

FIG. 1 is a partly schematic view of a braking system according to the invention, FIG. 2 shows part of a second embodiment of the invention.

DETAILED DESCRIPTION OF PREFERRED EMBODIMENTS OF THE INVENTION

Figure 3D:
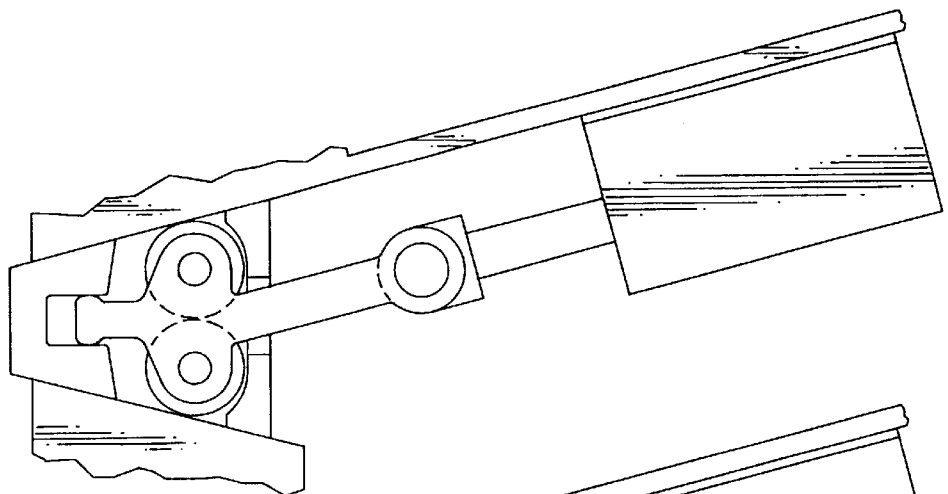
FIGS. 3a, 3b, 3c and 3d show part of a third embodiment of the invention in different conditions.
Figure 3C:
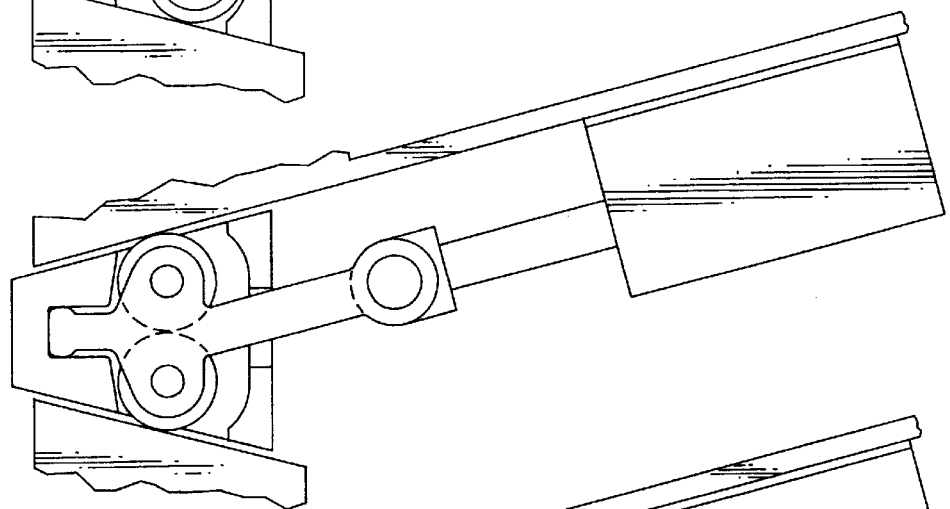

Referring to FIG. 1, in a first embodiment of the invention, a braking system comprises a brake pedal 10 mounted on a pivot 12, a pushrod 14 which operates the master cylinder 16 of a hydraulic brake actuation system, and a brake pad supported in a brake calliper 18 and movable by a hydraulic slave cylinder 22 into an actuated position in which it is in contact with a brake disk 20 to provide braking, from a released position in which it is clear of the disk 20. At the rear end of the pushrod 14 is a stirrup 24 having a base 26 attached to the main part of the pushrod 14 and two side arms 28 between which fits the front edge 30 of the brake pedal 10. Each of the side arms 28 has a slot 32 through it, and, protruding from each side of the brake pedal 10 is a boss 34 which extends through a respective one of the slots. The pushrod 14 can therefore move a limited distance longitudinally relative to the brake pedal 10 by movement of the bosses 34 along the slots 32.

A wedge 36 is supported between the arms 28 of the stirrup between the brake pedal 10 and the stirrup base 26. The wedge 36 is supported by means of a spring 38 which has one end attached to the top of the wedge and the other end attached to a support member 40 which is mounted on the base of the stirrup. The support member 40 and the front edge of the brake pedal 10 have respective flat surfaces 42, 44 on them which form a tapered gap 46 in which the wedge 36 is located. From the bottom of the wedge 36 extends a rod 48 which extends into a solenoid 50 mounted on the rear edge of the brake pedal 10 beneath the stirrup 24. The solenoid can therefore be powered to urge the wedge 36 into the gap 46 against the return force of the spring 38 to move the pushrod 14 and brake pedal 10 apart, thereby urging the brake pads towards the brake disks, and urging the brake pedal towards the driver, i.e. towards its fully released position. Clearly application of a braking pressure to the brake pedal 10 will tend to urge the pedal 10 and pushrod 14 towards each other thereby tending to narrow the gap 46.

The solenoid 50 is powered by a control unit 52 which receives inputs from various sensors including a brake pedal movement sensor 54, a sensor 56 for sensing movement of the accelerator 58, and a proximity sensor 60 for sensing the presence of a drivers foot within a predetermined distance of the brake pedal 10, as well as from the engine management system 62 which monitors and controls the operation of the engine of the vehicle. The control unit 52 monitors the current through the solenoid 50 which is indicative of the load on the wedge 36.

In operation, when the vehicle is being driven and the accelerator 58 is depressed, the brake pedal 10 and the wedge 36 stay in their rest position as shown in FIG. 1. If the accelerator 58 is released the control unit 52 detects this using the accelerator sensor 56. Since release of the accelerator is an indication that the brakes are likely to be applied, the control unit 52 anticipates this by powering the solenoid 50 to drive the wedge 36 upwards between the brake pedal 10 and the pushrod 14. This pushes the pushrod 14 and the brake pedal apart. Initially this takes up the slack in the system pushing the brake pedal 10 towards the driver towards the limit of its rearward travel. Then as the force increases it moves the pushrod 14 forwards until the brake pads are just in contact with the brake disks 20. This contact increases the pressure in the hydraulic system and the electrical load in the solenoid, and the control unit detects this increasing load. The control unit 52 then controls the current through the solenoid to maintain a predetermined light contact pressure between the brake pads and the brake disk 22 for a predetermined period of, say 5 seconds, and then retracts the wedge 36 by a predetermined distance to an intermediate, partially released position. The initial contact is not sufficient to provide any significant braking effect, but serves to dry the brake disks 20 if they are wet and to warm them slightly, which improves the effectiveness of the brakes if they are applied. This partial release has the advantage that the system acts in a similar manner to a brake adjuster so that, in the pre-activated state, the position of the brake pads is substantially fixed and the amount of brake pedal travel required to operate the brakes is therefore also substantially fixed.

The friction between the wedge 36 and the flat surfaces 42, 44 and the strength of the return spring 38 are arranged such that brakes can be held in this partially actuated or 'pre-activated' state with only minimal force from the solenoid 50. The brakes are held in the pre-activated state until either the accelerator pedal is depressed again, in which case the power to the solenoid will be cut and the wedge will be pushed out of the gap 46 by the return spring 38 allowing the brake pads to move away from the disks 20 back to their normal rest position, or the brake pedal 10 is depressed to activate the brakes. If this is done, because prior to the driver's foot coming into contact with the brake pedal 10 the wedge 36 has already taken up much of the slack in the brake actuation system and the brake pads are already moved into contact with the disks 20, only a relatively small amount of pedal travel is required to fully activate the brakes.

Furthermore, if the vehicle is in a frontal impact it is likely that, at the time of impact, the driver will have lifted his foot off the accelerator and at least placed it on the brake pedal. This means that, as the driver is moving forward as a result of the impact, the pedal will provide a significant resistance to that movement from the limit of its rearward travel, i.e. from the fully released position. This helps to absorb steadily the forces that the impact places on the driver's foot, and to reduce the chances of a sharp increase in those forces, and can therefore reduce the injury to the driver's leg.

The control unit 52 also uses the signals from the brake pedal sensor 54, the proximity sensor 60, and the engine management system to anticipate when the brakes might be applied. The proximity sensor 60 sends a signal to the control unit 52 as soon as the drivers foot approaches the brake pedal. If the accelerator pedal 58 has not been released so the solenoid 50 has not been activated, the control unit 52 responds to the movement of the driver's foot by activating the solenoid and moving the brake pads into the pre-activated position. This ensures that the brake pedal cannot be depressed without the brakes being partially activated, even when the accelerator pedal is still depressed. The brake pedal sensor sends a signal to the control unit 52 as soon as the brake pedal is moved out of its normal rest position. This can be used as a back-up to activate the system of the proximity sensor has not worked for any reason.

The signals from the engine management control unit 62 indicate when the vehicle is in overrun and the engine is producing more than a predetermined amount of engine braking. In this case the control unit 52 activates the solenoid 50 to move the brake pads into the partially activated position in anticipation of braking by the driver, regardless of the position of the brake and accelerator pedals 10, 58.

Once the brakes have been 'pre-activated' by the control unit 52 they will remain in that condition until all of the conditions for pre-activation have ceased, i.e. engine braking is below the predetermined level, the brake pedal has been released, the driver's foot has moved out of range of the proximity sensor 60, and the accelerator pedal has been depressed. There is then a short time delay before the brakes are fully released. This means that, under almost any circumstances in which the driver will apply the brakes, they will be partially actuated in preparation.

It will be appreciated that, in the embodiment shown in FIG. 1, as the wedge 36 moves upwards and the pedal rotates clockwise about its pivot 12, the surface 44 on the pedal will become misaligned with the surface of the wedge 36. Therefore, as shown in FIG. 2, it is preferable to include a second stirrup 164 pivotably mounted on a pin 134 which extends through the pedal 110 and is rigidly fixed to it. The pin 134 also extends through slots 132 in the stirrup 124 to which the pushrod 114 is attached as in the first embodiment. This stirrup 164 has two arms, one on each side of the pedal 110 and fits between the side arms 128 of the first stirrup 124. The wedge 136 therefore acts on the base 166 of the second stirrup 164 which acts on the pedal 110 via the pivot pin 134. As the wedge 136 moves upwards and the pedal 110 rotates, the second stirrup 164 rotates about the pin 134 so that its base 166 remains parallel to the face of the wedge 136 which is acting on it.

In a modification of the system described, the partial retraction can be achieved simply by providing a mechanical stop which prevents return of the wedge 36 past an intermediate position under the force of the return spring 38, but which can be overcome by applying current to the solenoid to positively withdraw the wedge 36. Alternatively it can be achieved by using an over-center spring as the non-return spring 38. This arrangement has the advantages that the solenoid does not have to be powered for all of the time that the brakes are in the pre-activated state, and that the brake pads are not be held in contact with the disks 20 for long periods of time which could cause excessive heating and wear.

Figure 3B:
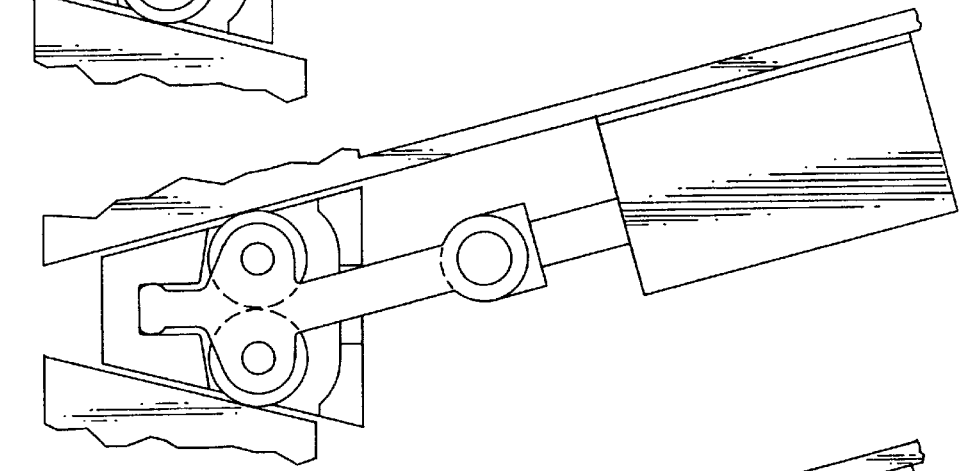
Figure 3G:
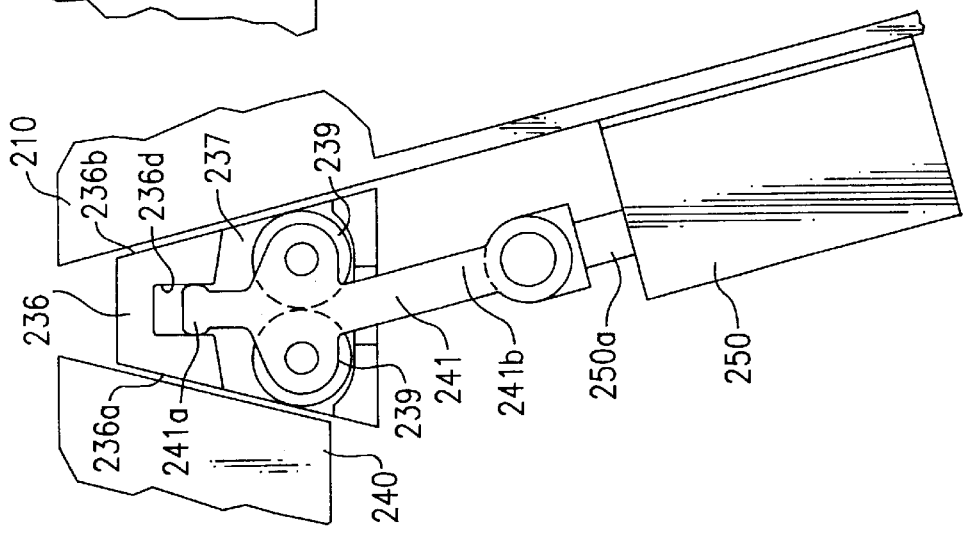

Referring to FIGS. 3a, 3b, 3c and 3d, in a further embodiment of the invention the wedge 36 and solenoid 48, 50 are replaced by a modified wedge 236 and a ball screw actuator 250. The wedge 236 acts between the pedal 210 and a reaction member 240 connected to the pushrod 214. The wedge 236 has a cavity 237 inside it with an opening in each of the operating faces 236a, 236b of the wedge, and which houses a pair of rollers 239 rotatably mounted on a carrier 241. The carrier 241 has a projection 241a on its front end, pointing towards the narrow end of the wedge 236, which is slidably received in a guide slot 236d in the wedge. The carrier also has stem 241b which extends out through the wide end of the wedge 236 and is connected to the shaft 250a of the actuator. The carrier 241 and rollers 239 can therefore be moved backwards and forwards relative to the wedge 236, with the limit of forward travel being the point at which the projection 241 on the carrier 241 contacts the end of the guide slot 236d, and the limit of backward travel being the point at which the rollers 239 contact the rear end of the cavity 237 in the wedge 236. The rollers 239 are mounted side by side on the carrier so that they are in contact with each other and so that, with the carrier in its rearmost position, as shown in FIG. 3a, the surfaces of the rollers are just below the operating surfaces 236a, 236b of the wedge, and with the carrier in its forwardmost position, as shown in FIG. 3b, the rollers project above the operating surfaces 236a, 236b.

The actuator 250 is controlled by a control unit similar to that of FIG. 1, and having the same sensor inputs. When the brakes are fully released and the system does not anticipate their operation, the wedge 236 in the position shown in FIG. 3a, fully retracted with its operating faces 236a, 236b clear of the pedal 210 and the reaction member 240. When braking is anticipated, the actuator pushes the carrier 241 forward, firstly to the position shown in FIG. 3b wherein the rollers 239 project from the sides of the wedge and contact the surfaces on the pedal 210 and reaction member 240. Then when the projection 241a on the carrier contacts the end of the guide slot 326d, as the actuator then continues to push the carrier 241 forwards towards the position shown in FIG. 3c, the carrier 241 carries the wedge 236 with it. As the rollers 239 are pushed forwards they urge the reaction member 240 and pedal 210 apart, taking up slack in the braking system and bringing the brake pads into contact with the brake disks. As the rollers roll up the surfaces of the pedal 210 and reaction member 240 they remain in contact with each other and, because they turn in opposite directions, roll against each other. Therefore force is transmitted from the pedal 210 to the reaction member 240 directly through the rollers, and the forces on the carrier 241 are substantially less than those on the rollers 239. When the wedge 236 reaches the position shown in FIG. 3c, i.e. when the brake pads contact the brake discs, the pressure in the hydraulic brake circuit increases rapidly, and this is detected by changes in the current in the actuator. At this point the driving current to the actuator 250 is cut. The pressure in the braking system urges the reaction member 240 and pedal 210 together, which in turn urges the rollers 239 in the rearward direction, or downwards as shown on FIGS. 4a to 4d. The rollers 239 and carrier 241 therefore move relative to the wedge 236, which may be held in place by a weak spring, until the rollers 239 are retracted below the operating surfaces 236a, 236b of the wedge. At this point, as shown in FIG. 3d, the pedal 210 and reaction member 240 trap the wedge 236 between them and are prevented from moving together further by the wedge 236. The brakes are therefore partially released, the brake pads having moved away from the discs by an amount which is determined by the amount by which the rollers 239 project above the operating surfaces 236a, 236b of the wedge 236 when the carrier is in its forwardmost position.

As with the first embodiment the brakes are held in the partially released intermediate position until all the possible indicators of intended braking are absent. However, the advantage of this embodiment is that no power is required of the actuator to hold the brakes in the intermediate position, since the wedge 236 does this by virtue of the friction between it and the pedal 210 and reaction member 240. When the brakes need to be returned to the fully released condition, the actuator 250 is operated in reverse to positively retract the carrier 241, and therefore the wedge 236 to its initial position as shown in FIG. 3a.

As an alternative to using the actuator current to detect when the brake pads contact the brake discs, a pressure sensor in the hydraulic circuit could be used. As a further alternative the actuator could be arranged so as to have a limited force just sufficient to bring the pads and discs into contact without producing significant braking. This would have the advantage of simplifying the control of the actuator, which could simply be turned on for a brief period, long enough to allow the pads to reach the discs, and then turned off again to allow the pads to return to the partially released position.

The above embodiments are all systems in which the force applied by the driver to the brake pedal is transmitted to the brake, generally through a booster and hydraulic actuation system. However, the present invention also has application in so called 'brake-by-wire' systems in which movement of the brake pedal is sensed by a control unit which operates the brakes solely by means of an electrical actuator. In this type of system a single actuator can be used both for normal actuation of the brakes and for pre-actuation as described above. If the actuator is a linear type actuator, which frequently takes the form of a ball screw actuator, pre-actuation can be achieved in a manner corresponding to the first embodiment described above, the brakes being applied up to a predetermined actuator force and then retracted by a predetermined distance to a partially released state. It is also known to use electrically driven wedge-type actuators in drive-by-wire systems, particularly with drum brakes, and the wedge and roller arrangement described above with reference to FIGS. 3a, 3b, 3c and 3d could clearly by used in such a system.

What is claimed is:

1. A brake system for a vehicle having a wheel, the system comprising:
    a brake having a rotatable member arranged to rotate with said wheel and a braking member movable between an engaged position in which it is in contact with the rotatable member and provides braking, a released position, and a partially released position;
    a driver input member arranged to be operated by a driver of the vehicle to control movement of the braking member; and
    actuation means arranged to anticipate operation of the brake by the driver and, when operation of the brake is anticipated, to move the braking member into the engaged position and then to return it to the partially released position, and when operation of the brake is no longer anticipated to return the braking member to the released position.

2. A system according to claim 1 wherein the actuation means is arranged to apply a predetermined force when operation of the brake is anticipated to move the braking member into contact with the rotatable member.

3. A system according to claim 1 wherein the actuation means is arranged to produce a predetermined contact force between the braking member and the rotatable member.

4. A system according to claim 1 wherein in the partially released position the braking member is clear of the rotatable member.

5. A system according to claim 4 wherein the partially released position is a predetermined distance from the rotatable member.

6. A system according to claim 1 wherein to return the braking member to the partially released position, the actuating means reduces the force on it by a predetermined amount.

7. A system according to claim 1 wherein the actuation means comprises an actuator also controllable by the driver input member to produce normal braking.

8. A system according to claim 1 wherein the driver input member comprises a brake pedal.

9. A system according to claim 1 wherein the actuation means includes sensing means for sensing an action by the driver and control means arranged to anticipate operation of the brakes by the sensing of said action.

10. A system according to claim 9 wherein the actuation means is arranged to hold the braking system in a partially actuated condition until the sensing means indicates that braking by the driver is no longer anticipated.

11. A vehicle brake actuation system comprising a hydraulic brake actuation circuit including a master cylinder, a driver input member and force transmitting means arranged to transmit force from the driver input member to the master cylinder to provide normal braking, the force transmitting means including two parts, and actuation means arranged to anticipate operation of the brakes by the driver and, when operation of the brakes is anticipated, to move said two parts apart to take up slack in the actuation system; the actuating means including a wedge arrangement to be driven between said parts to move the brake members toward the rotatable member;
    said parts each defining one side of a tapered gap into which the wedge can be driven; and
    the wedge having an operating face arranged to contact one of said parts and the actuation means further comprises a roller arranged to protrude beyond the operating face to aid movement of the wedge when is driving said parts apart.

12. A system according to claim 11 wherein one of said parts comprises a driver operated pedal.

13. A system according to claim 11 wherein one of said parts comprises a pushrod.

14. A system according to claim 11 wherein said roller is retractable below said operating face so as to allow the retraction of the braking member to the partially released position.

15. A system according to claim 14 wherein the wedge has a further operating face and the actuation means includes a further roller arranged to protrude beyond said further operating face and be retractable below it.

16. A system according to claim 15 wherein release of the braking member is arranged to be checked by contact of said parts with said operating faces which thereby defines the partially released position.

17. A system according to claim 15 wherein the rollers are arranged so as to be in contact with each other and to roll against each other as the wedge is driven between said parts so that at least a substantial part of the load on each roller from the respective one of said parts is transmitted through that roller directly into the other roller.

18. A system according to claim 15 wherein the rollers are mounted on a common carrier which is movable relative to the wedge to allow retraction of the rollers.

19. A system according to claim 18 wherein wedge has a direction of movement in which it moves to drive said parts apart, and the carrier is movable parallel to said direction of movement so as to move the rollers relative to the wedge.

20. A system according to claim 19 further comprising stop means which limits relative movement of the carrier and the wedge and thereby limits the amount by which the rollers can project beyond the operating faces of the wedge.

21. A brake system for a vehicle having a component comprising driver input means to allow actuation of the brakes by a driver, partial actuation means operable to partially actuate the brake system, sensing means, and control means arranged to anticipate, on the basis of signals from the sensing means, operation of the driver input means and, when such operation is anticipated, to operate the partial actuation means to effect partial actuation of the system thereby to take up slack in the system, and to determine on the basis of said signals when such operation is no longer anticipated, and respond by releasing the partial actuation means, wherein the control means is arranged to monitor the condition of the component and to anticipate operation of the brake from said condition.

22. A system according to any one of claim 21 wherein the control means is arranged to anticipate operation of the driver input means prior to the driver making contact with it.

23. A system according to claim 21 wherein the sensing means comprises proximity sensing means arranged to sense the proximity of a part of a driver to the driver input member.

24. A system according to claim 21 for a vehicle having an accelerator wherein the vehicle sensing means is arranged to sense release of the accelerator.

25. A system according to claim 21 wherein said component comprises a part a power train of the vehicle.

26. A system according to claim 25 wherein the control means is arranged to anticipate operation of the brake by sensing when the power train is in overrun applying a braking force to the vehicle.

* * * * *